United States Patent [19]

Kobayashi et al.

[11] Patent Number: 5,653,145
[45] Date of Patent: Aug. 5, 1997

[54] EXTERNAL CIRCULATION TYPE BALL THREAD DEVICE

[75] Inventors: Shuichi Kobayashi; Kazuo Miyaguchi, both of Gunma, Japan

[73] Assignee: NSK Ltd, Tokyo, Japan

[21] Appl. No.: 504,551

[22] Filed: Jul. 20, 1995

[30] Foreign Application Priority Data

Jul. 22, 1994 [JP] Japan .................................. 6-171344

[51] Int. Cl.$^6$ .................................................. F16H 25/22
[52] U.S. Cl. .................................... 74/459; 74/424.8 R
[58] Field of Search ........................ 74/424.8 R, 459

[56] References Cited

U.S. PATENT DOCUMENTS 2,855,790  10/1958  Smith ......................................... 74/459
3,143,896  8/1964  Edwards ....................................... 74/459

*Primary Examiner*—Allan D. Herrmann
*Attorney, Agent, or Firm*—Sughrue, Mion, Zinn, Macpeak & Seas

[57] ABSTRACT

An external circulation type ball thread device includes a threaded shaft having a ball thread groove in the outer surface; a ball nut having a ball thread groove in the inner surface; and a number of balls fitted between those ball thread grooves, the balls being circulated while being led in a ball circulating tube which is secured to the outer surface of the ball nut with a tube retaining member. In the device, the ball nut has in the outer surface a tube supporting groove which is formed along the ball circulating tube which is arranged inclined with respect to the axis of the threaded shaft, to support the bottom of the ball circulating tube, and an annular groove which is formed across the tube supporting groove; and the tube retaining member is made of an elastic thin plate in such a manner that the tube retaining member is substantially C-shaped in section so as to be fitted in the annular groove, and has an engaging groove which is engaged with the ball circulating tube. Thus, the device is simple in structure and high in productivity.

3 Claims, 4 Drawing Sheets

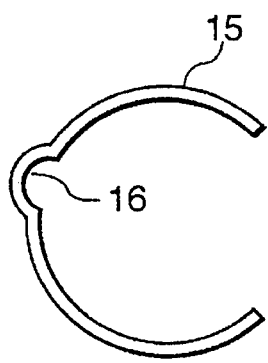
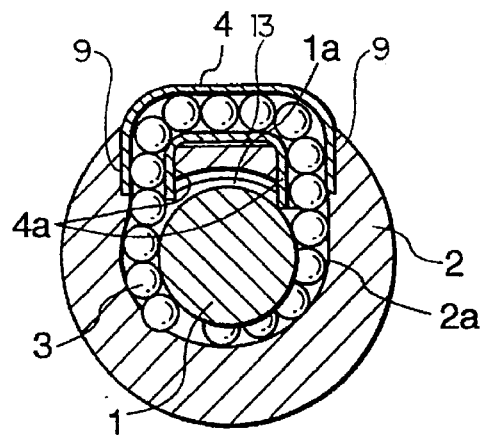
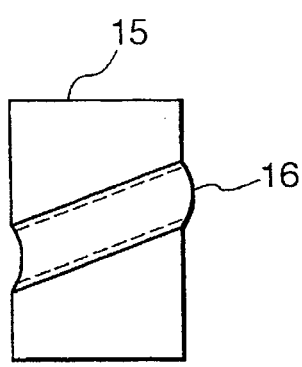
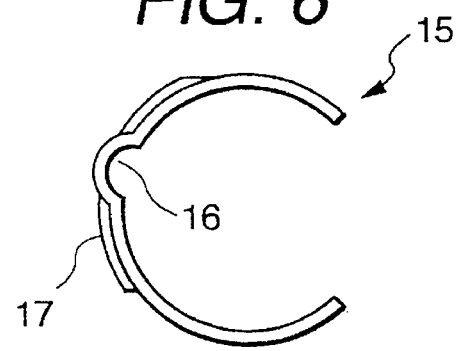
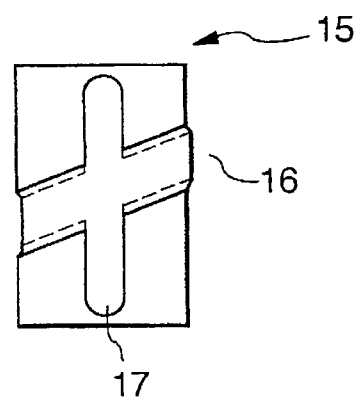

EXTERNAL CIRCULATION TYPE BALL THREAD DEVICE

BACKGROUND OF THE INVENTION

The present invention relates to ball thread devices, and more particularly to an improvement of a ball-circulating-tube fixing structure in an external circulation type ball thread device.

An external circulation type ball thread device is available in which, as shown in FIG. 8, a ball nut 2 is engaged through a number of balls (not shown) with a threaded shaft 1, and a ball circulating tube 4 is provided on the outer surface of the ball nut 2 so that the balls are circulated while being led outside the ball nut 2. In the ball thread device, the ball circulating tube 4 is fixedly mounted on the outer surface of the ball nut 2 with a tube retaining member 5. The tube retaining member 5 is formed as follows: As shown in FIGS. 10 and 11, a metal block whose thickness is larger than the outside diameter of the ball circulating tube 4 is formed into a rectangular parallelepiped by milling. A tube engaging groove 6 is formed in the rectangular parallelepiped by end milling in such a manner that it is extended obliquely in the bottom. Thereafter, a plurality of flat countersunk head screw holes 7 (two holes in the case of FIG. 10) are formed in the rectangular parallelepiped on both sides of the tube engaging groove 6 by drilling. Thus, the tube retaining member 5 has been fabricated.

On the other hand, as shown in FIG. 9, the outer surface of the ball nut 2 has a flat surface 8 which is formed by milling to mount the ball circulating tube 4 and the tube retaining member 5 on it. Holes 9 for mounting the ball circulating tube 4 are formed in the flat surface 8, and in addition threaded holes 10 for mounting the tube retaining member 5 are formed in the flat surface 8 by tapping.

However, the above-described the external circulation type ball thread device suffers from the following problems:

As was described above, in the conventional device, the tube retaining member 5 is formed through a number of manufacturing steps including milling, end milling and drilling steps, and in order to form the flat surface 8 on the ball nut 2, a relatively large part of the nut is removed by milling, and the threaded holes for mounting the ball retaining member 5 are formed by tapping. That is, the formation of a ball-circulating-tube mounting structure takes a lot of time and labor.

On the other hand, the ball circulating tube 4 is mounted on the ball nut as follows: Both end portions of the ball circulating tube 4 are inserted into the mounting holes 9 and 9 formed in the ball nut 2, respectively, and the ball circulating tube 4 is held with the tube retaining member 5, and small flat countersunk head screws $B_1$ are engaged with the threaded holes 10 and tightened. Thereafter, in order to eliminate the play of the ball circulating tube which is due to the gap C (FIGS. 11 and 12) between the ball circulating tube 4 and the tube engaging groove 6 formed in the tube retaining member 5, the retaining member must be adjusted as follows: With the screws $B_1$ loosened, the tube retaining member 5 is removed from the ball nut 2. And the bottom of the tube retaining member 5 is ground until the gap C is substantially zero. That is, assembling the device takes a lot of time and labor.

SUMMARY OF THE INVENTION

In view of the foregoing, an object of the present invention is to provide a ball thread device simple in structure and high in productivity in the manufacture of which machining operations required for mounting the ball circulation tube, such as the operation of cutting the ball nut to form the mounting flat surface on it, the operation of tapping the mounting flat surface, and the operation of precisely grinding the tube retaining member, are eliminated as much as possible, and no troublesome adjustment is required when it is assembled.

The foregoing object and other objects of the invention have been achieved by the provision of an external circulation type ball thread device comprising: a threaded shaft having a ball thread groove in the outer surface thereof; a ball nut having a ball thread groove in the inner surface thereof which confronts with the ball thread groove of the threaded shaft; a number of balls fitted between the ball thread groove of the threaded shaft and the ball thread groove of the ball nut, the balls being circulated while being led in a ball circulating tube which is secured to the outer surface of the ball nut with a tube retaining member, wherein the ball nut has in the outer surface a tube supporting groove which is formed along the ball circulating tube which is arranged inclined with respect to the axis of the threaded shaft, to support the bottom of the ball circulating tube, and an annular groove which is formed across the tube supporting groove, and the tube retaining member is made of an elastic thin plate in such a manner that the tube retaining member is substantially C-shaped in section so as to be fitted in the annular groove, and has an engaging groove which is engaged with the ball circulating tube.

In the ball thread device of the invention, the tube retaining member can be formed by pressing a metal plate or by molding plastic material; that is, the fabrication of the tube retaining member, unlike that of the conventional one, needs no intricate machining operation.

In the ball nut, the annular groove, with which the tube retaining member is engaged, is formed readily by lathe turning. And, only the tube supporting groove for the ball circulating tube is formed across the annular groove by end milling.

The ball circulating tube is secured to the ball nut as follows: Both end portions of the ball circulating tube are inserted into tube inserting holes formed in the ball nut in such a manner that the tube supporting groove supports the bottom of the ball circulating tube. Under this condition, the tube retaining member is fitted in the annular groove of the ball nut with the aid of its elasticity so that its engaging groove is engaged with the ball circulating tube. Thus, the tube retaining member is fixedly fitted on the ball nut with a snap. In mounting the ball circulating tube on the ball nut, no screws are used; that is, its elasticity is used. Hence, the manufacture of the device needs no operation of tapping the ball nut.

BRIEF DESCRIPTION OF THE DRAWINGS

FIG. 3 is a front view showing a tube retaining member in the ball thread device of FIG. 1;

FIG. 4 is a plan view showing the tube retaining member of FIG. 3;

FIG. 5 is a sectional view taken along line V—V in FIG. 1, for a description of the operation of the ball thread device of the invention; FIGS. 6 and 7 are front view and a plan view, respectively, showing a tube retaining member in another example of the ball thread device, which constitutes a second embodiment of the invention;

DETAILED DESCRIPTION OF THE INVENTION

Figure 1:
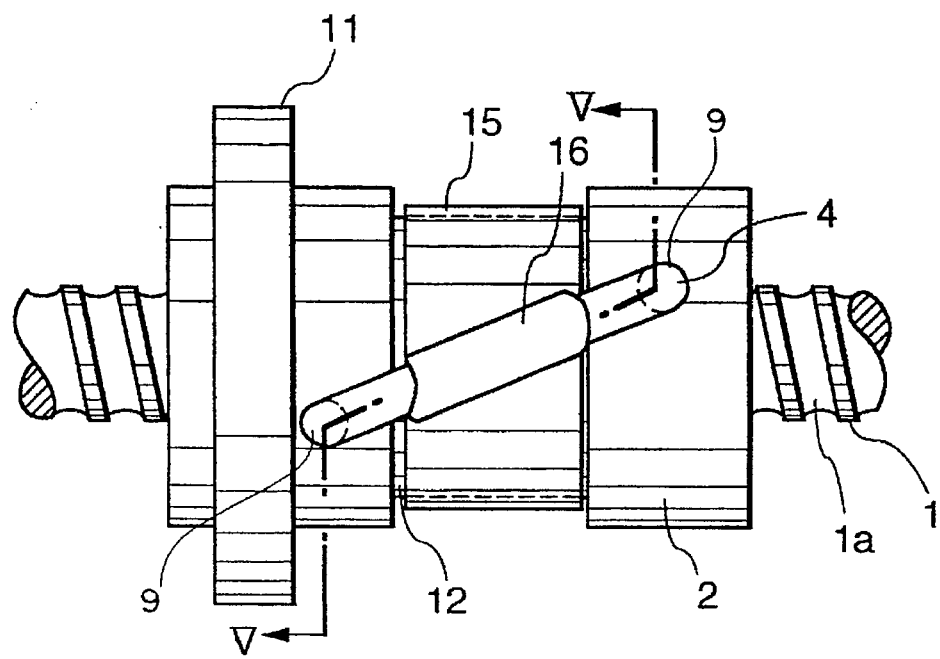
FIG. 1 is a plan view showing an example of an external circulation type ball thread device, which constitutes a first embodiment of the invention.

Preferred embodiments of the invention will be described with reference to the accompanying drawings.

An external circulation type ball thread device, which constitutes a first embodiment of the invention, will be described with reference to FIGS. 1 through 5, in which parts corresponding functionally to those already described with reference to the conventional ball thread device are therefore designated by the same reference numerals or characters.

Figure 2:
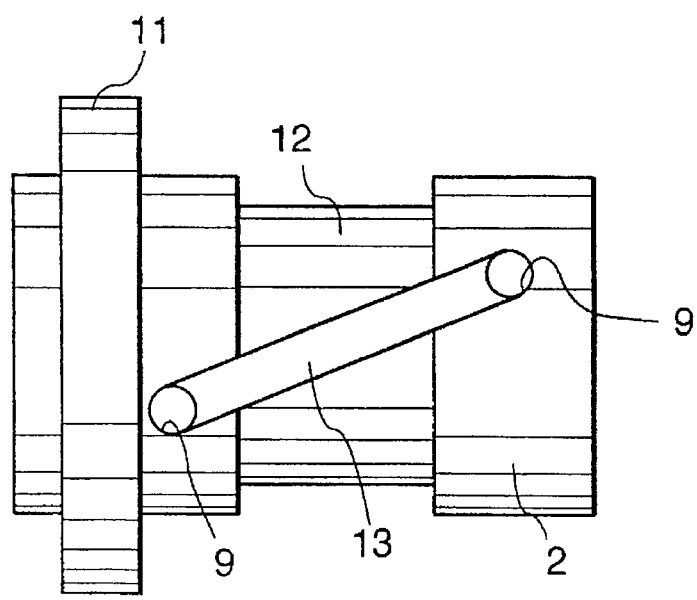
FIG. 2 is a plan view showing a ball nut in the ball thread device of FIG. 1.
Figure 8:
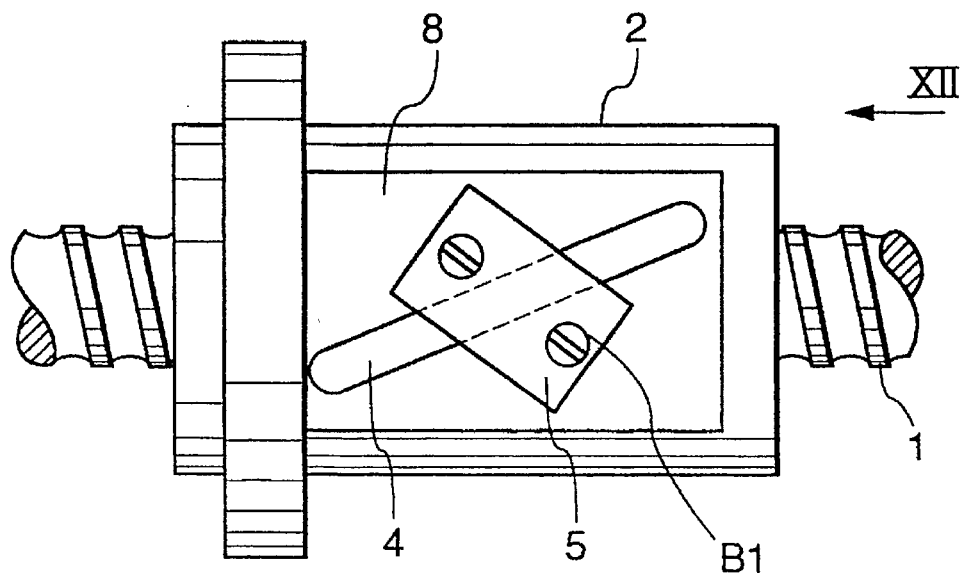
FIG. 8 is a plan view of a conventional external circulation type ball thread device.
Figure 9:
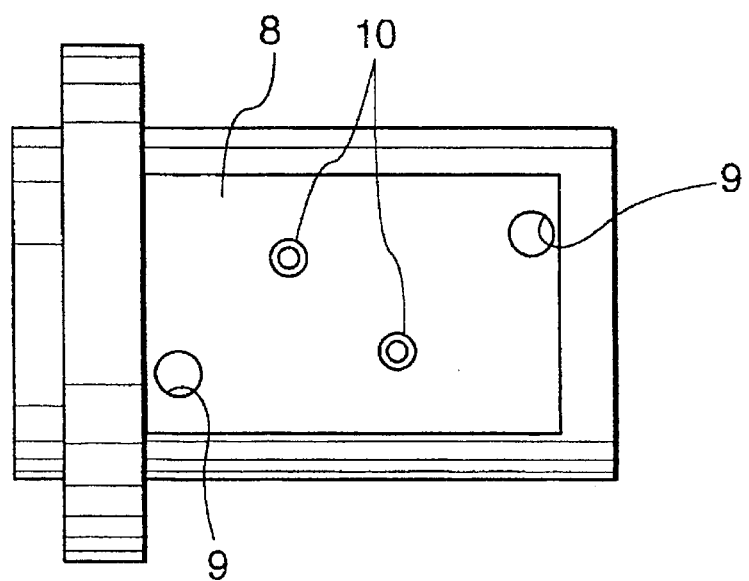
FIG. 9 is a plan view of a ball nut in the conventional device shown in FIG. 8.
Figure 10:
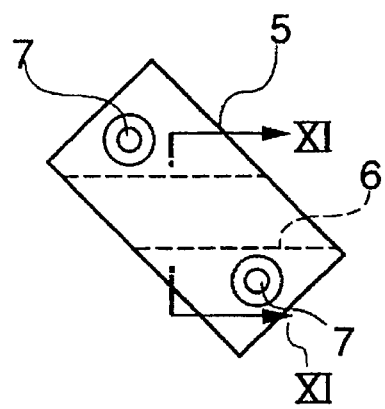
FIG. 10 is a plan view of a tube retaining member in the conventional device shown in FIG. 8.
Figure 11:
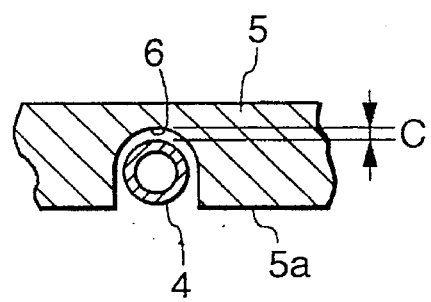
FIG. 11 is a sectional view taken along line XI—XI in FIG. 10.
Figure 12:
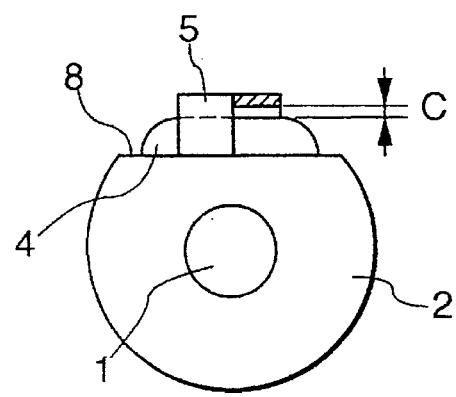
FIG. 12 is a view, with parts cut away, taken in the direction of the arrow XII in FIG. 8.

The ball thread device, as shown in FIGS. 1 and 2, comprises a threaded shaft 1 and a ball nut 2. The threaded shaft 1 has a ball thread groove 1a in the outer surface. The ball thread groove 1a is arcuate in section. The ball nut 2 is substantially in the form of a cylinder having a ball thread groove 2a in the inner surface which corresponds to the ball thread groove 1a of the threaded shaft 1. A mounting flange 11 is formed on the outer cylindrical surface of one end portion of the ball nut 2. The ball nut 2 has a relatively shallow annular groove 12 in the middle portion of the outer cylindrical surface of the ball nut 2 as viewed in the direction of axis. The annular groove 12 is formed by lathe turning, thus providing two cylindrical end portions on its both sides. Two tube inserting holes 9 and 9 are formed in the two cylindrical end portions of the ball nut 2, respectively, in such a manner that they are communicated with the ball thread groove 2a formed in the inner surface of the ball nut 2, so that both end portions of a substantially U-shaped ball circulation tube 4 are inserted into the tube inserting holes 9, respectively. The outer openings of the tube inserting holes 9 are communicated with each other through a tube supporting groove 13 which is formed between them by end milling in such a manner that it is inclined with respect to the axis of the ball nut. The width of the tube supporting groove 13 is substantially equal to the outside diameter of the ball circulating tube 4.

The ball thread device further comprises a tube retaining member 15 which is fitted in the annular groove 12 of the ball nut 2. The tube retaining member 15, as shown in FIGS. 3 and 4, is substantially C-shaped in section, having a width and a diameter corresponding to those of the annular groove 12 of the ball nut 2. The middle portion of the tube retaining member 15 is curved into an engaging groove 16 which is engaged with the ball circulating tube 4. The tube retaining member 15 is formed by pressing a thin metal plate, and it is therefore elastic.

The ball circulating tube 4 is mounted to the ball nut 2 as follows:

Both end portions of the U-shaped ball circulating tube 4 are inserted into the tube mounting holes 9 and 9 of the ball nut 2, respectively, in such a manner that the lower surface of the ball circulating tube 4 is in contact with the bottom of the tube supporting groove 13 formed in the ball nut 2.

Thereafter, the tube retaining member 15, while slightly being opened, is fitted in the annular groove 12 of the ball nut 2, with the engaging groove 16 being engaged with the ball circulating tube 4. In this operation, the tube retaining member 15 binds the ball nut 2 tightly with its elastic force, and positively fixes the ball circulating tube 4 by pressing the tube 4 against the tube supporting groove 13.

In the embodiment, the ball circulating tube 4 can be positively secured to the ball nut 2 almost in one action, without mounting screws. Dimensional errors between the ball circulating tube 4 and the tube retaining member 15, if any, are absorbed by the elasticity of the tube retaining member 15. This feature eliminates the difficulty accompanying the conventional ball thread device that the gap is formed between the ball circulating tube 4 and the tube retaining member 15. Accordingly, the ball thread device of the invention is completely free from the troublesome work that, for adjustment of the ball thread device which has been assembled, the tube retaining member 5 is removed therefrom and machined again.

The tube retaining member 15 can be readily formed by pressing a metal plate, and accordingly it can be easily mass-produced. In the ball thread device of the invention, the operation of machining the ball nut 2 to mount the ball circulating tube on it can be achieved much more readily than in the case of the conventional ball thread device; that is, the ball thread device of the invention is greatly reduced in manufacturing time and cost when compared with the conventional device.

The external circulation type ball thread device is operated with the balls being circulated through the ball circulating tube 4 thus mounted.

FIG. 5 shows how the balls are circulated in the operation of the ball thread device.

As shown in FIG. 5, a number of balls 3 are provided in a spiral ball-rolling path which is defined by the ball thread groove 1a of the threaded shaft 1 inserted into the ball nut 2 and the ball thread groove 2a of the ball nut 2 which confronts with the ball thread groove 1a, and a ball circulating path which is formed in the U-shaped ball circulating tube 4 mounted on the ball nut 2. By the relative spiral motion of the ball nut 2 and the threaded shaft 1, those balls 3 are rolled along the spiral ball-rolling path formed between the ball thread grooves 1a and 2a, and scooped up by one end 4a of the ball circulating tube 4 into the ball circulating path defined in the tube 4. The balls 3 thus scooped up are moved along the ball circulating path in the ball circulating tube 4; that is, they are moved over several turns of the ball rolling path defined by the ball thread grooves 1a and 2a, and then entered into the ball rolling path again. The balls 3 are repeatedly circulated in the above-described manner. When the relative spiral motion of the ball nut 2 and the threaded shaft 1 is changed in direction, the balls are circulated in the opposite direction. Thus, with the aid of the balls 3 which are circulated while being rolled in the above-described manner, the relative spiral motion of the ball nut 2 and the threaded shaft is smoothly carried out. In this operation, the ball circulating tube is never allowed to play.

As is apparent from the above-description, in the manufacture of the ball thread device of this embodiment of the invention, the machining operations required for mounting the ball circulating tube in the conventional device, such as the operation of cutting the ball nut to form the tube mounting flat surface on it, the operation of tapping the flat surface, and the operation of precisely grinding the tube retaining member, are eliminated, and no troublesome adjustment is required when it is assembled. The ball thread device according to the invention is simple in structure and high in productivity.

Another example of the ball thread device, which constitutes a second embodiment of the invention, will be described with reference to FIGS. 6 and 7.

The second embodiment is different from the first embodiment in that its tube retaining member 15 has a reinforcing groove 17 which is extended across the engaging groove 16 while being radially outwardly protruded. The reinforcing groove 17 increases the rigidity in radial direction of the tube retaining the tube retain result of which the tube retaining member 15 is able to hold the ball circulating tube 4 more positively.

The other arrangements and effects of the second embodiment are the same as those of the first embodiment.

In the above-described embodiments, the tube retaining member 15 is made of an elastic metal plate; however, the invention is not limited thereto or thereby. That is, it may be, for instance, of an elastic plastic plate.

As was described above, in the external circulation type ball thread device of the invention, the tube retaining member for fixing the ball circulating tube is made of an elastic thin plate in such a manner that it is substantially C-shaped in section, and has the engaging groove in its middle portion which is engaged with the ball circulating tube; and the ball nut has the tube supporting groove which supports the bottom of the ball circulating tube, and the annular groove which is formed across the tube supporting groove. The tube retaining member is fitted in the annular groove with the aid of its elasticity in such a manner that the engaging groove is engaged with the ball circulating tube to fix the ball circulating tube. Hence, the tube retaining member can be readily formed by pressing a metal plate or by molding plastic material; that is, the manufacture of the tube retaining member, unlike that of the conventional one, needs no intricate machining operation.

On the other hand, the ball nut can be formed with ease. That is, in the ball nut, the annular groove is formed readily by lathe turning. That is, the fabrication of the ball nut, unlike that of the conventional one, is free from the operation of forming the tube mounting flat surface by milling, and the operation of tapping the ball nut. Thus, the external circulation type ball thread device of the invention can be assembled with ease, and is high in productivity and low in manufacturing cost. While there has been described in connection with the preferred embodiments of the invention, it will be obvious to those skilled in the art that various changes and modifications may be made therein without departing from the invention, and it is aimed, therefore, to cover in the appended claim all such changes and modifications as fall within the true spirit and scope of the invention.

What is claimed is:

1. An external circulation type ball thread device, comprising:

a threaded shaft having a ball thread groove in an outer surface thereof;

a ball nut having a ball thread groove in an inner surface thereof which confronts with said ball thread groove of said threaded shaft;

a number of balls fitted between said ball thread groove of said threaded shaft and said ball thread groove of said ball nut;

a ball circulating tube into which said balls are led to circulate; and a tube retaining member for securing said ball circulating tube to an outer surface of said ball nut;

wherein said ball nut has in the outer surface thereof a tube supporting groove which is formed along said ball circulating tube which is arranged inclined with respect to an axis of said threaded shaft, to support a bottom of said ball circulating tube, and an annular groove which is formed across said tube supporting groove, and wherein said tube retaining member is made of an elastic thin plate in such a manner that said tube retaining member is substantially C-shaped in section so as to be fitted in said annular groove, and said tube retaining member has an engaging groove which is engaged with said ball circulating tube.

2. An external circulation type ball thread device as claimed in claim 1, wherein said engaging groove is formed at a middle portion of said tube retaining member.

3. An external circulation type ball thread device as claimed in claim 1, wherein said tube retaining member has a reinforcing groove which is extended across said engaging groove while being radially outwardly protruded.

* * * * *